United States Patent
Chirammal et al.

(10) Patent No.: US 10,601,917 B2
(45) Date of Patent: Mar. 24, 2020

(54) CONTAINERIZED HIGH-PERFORMANCE NETWORK STORAGE

(71) Applicant: Red Hat, Inc., Raleigh, NC (US)

(72) Inventors: Humble Devassy Chirammal, Thrissur (IN); Mohamed Ashiq Liyazudeen, Coimbatore (IN); Stephen James Watt, Cedar Park, TX (US); Luis Pablo Pabon, Sturbridge, MA (US)

(73) Assignee: Red Hat, Inc., Raleigh, NC (US)

( * ) Notice: Subject to any disclaimer, the term of this patent is extended or adjusted under 35 U.S.C. 154(b) by 228 days.

(21) Appl. No.: 15/700,829

(22) Filed: Sep. 11, 2017

(65) Prior Publication Data
US 2018/0375936 A1 Dec. 27, 2018

Related U.S. Application Data

(60) Provisional application No. 62/525,594, filed on Jun. 27, 2017.

(51) Int. Cl.
*H04L 29/08* (2006.01)
*H04L 12/24* (2006.01)
*H04L 12/26* (2006.01)

(52) U.S. Cl.
CPC ...... *H04L 67/1097* (2013.01); *H04L 41/0806* (2013.01); *H04L 43/0858* (2013.01);
(Continued)

(58) Field of Classification Search
CPC . H04L 41/0806; H04L 41/12; H04L 43/0858; H04L 43/0864; H04L 43/16;
(Continued)

(56) References Cited

U.S. PATENT DOCUMENTS 10,289,496 B1 * 5/2019 Chopra ............... G06F 11/1461
2003/0026254 A1 * 2/2003 Sim ...................... H04L 47/125
370/392
(Continued)

OTHER PUBLICATIONS

Persistant Storage Using GlusterFS; Installation and Configuration; OpenShift Origin Latest; https://docs.openshift.org/latest/install_config/persistent_storage/persistent_storage_glusterfs.html; 2016 (10 pages).
(Continued)

*Primary Examiner* — Le H Luu
(74) *Attorney, Agent, or Firm* — K&L Gates LLP

(57) ABSTRACT

Containerized high-performance network storage is disclosed. For example, first and second memories are associated with first and second hosts and separated by a network. A storage controller and a container scheduler execute on processors. The container scheduler instantiates first and second storage containers on the respective first and second hosts. The storage controller configures the first and second storage containers as first and second storage nodes of a distributed file system. The container scheduler instantiates a service container on the first host. The storage controller receives a persistent volume claim associated with the service container and then creates a persistent storage volume in the first storage node based on the persistent volume claim. The persistent storage volume is mapped to the service container, where a content of the persistent storage volume is replicated to the second storage node.

20 Claims, 10 Drawing Sheets

(52) U.S. Cl.
CPC .......... *H04L 43/16* (2013.01); *H04L 67/1095* (2013.01); *H04L 67/322* (2013.01); *H04L 41/12* (2013.01); *H04L 43/0864* (2013.01)

(58) Field of Classification Search
CPC ............. H04L 67/1095; H04L 67/1097; H04L 67/322; H04L 67/104; H04L 47/125; G06F 11/1461; G06F 11/2005; G06F 16/16; G06F 16/1774; G06F 16/44; G06F 16/9027

See application file for complete search history.

(56) References Cited

U.S. PATENT DOCUMENTS

| | | | | |
|---|---|---|---|---|
| 2007/0168693 | A1* | 7/2007 | Pittman | G06F 11/2005 714/4.11 |
| 2008/0065583 | A1* | 3/2008 | Coverston | G06F 16/16 |
| 2013/0066931 | A1* | 3/2013 | Lacapra | H04L 67/104 707/827 |
| 2015/0280959 | A1* | 10/2015 | Vincent | G06F 16/1774 709/203 |
| 2015/0363423 | A1* | 12/2015 | Utgikar | H04L 67/1095 707/827 |
| 2018/0189296 | A1* | 7/2018 | Ashour | G06F 16/44 |
| 2018/0198765 | A1* | 7/2018 | Maybee | G06F 21/602 |

OTHER PUBLICATIONS

Ignite Docker-In-A-Box; Cloudistics; 2016 (2 pages).
Container Demand New Data Center Designs: 5 Steps to Survive; David Linthicum; Cloud Technology Partners; Mar. 23, 2017 (9 pages).
Robert Stroud's Blog, Hyperconverged Solutions With Containers to Become the "Norm"!; Forrester Blogs; Dec. 29, 2015 (2 Pages).
Running GlusterFS Inside Kumbernetes; https://github.com/wattsteve/glusterfs-kubernetes/tree/dde50a3fb27f4560edc23af5284f7c1346ca924e; Sep. 22, 2015 (3 pages).
Simple Ring Allocator; https://github.com/heketi/heketi/wiki/Simple-Ring-Allocator; Jul. 15, 2016 (3 pages).

* cited by examiner

US 10,601,917 B2

CONTAINERIZED HIGH-PERFORMANCE NETWORK STORAGE

CROSS REFERENCE TO RELATED APPLICATION

The present application is a non-provisional of U.S. Provisional Application Ser. No. 62/525,594, filed Jun. 27, 2017, the entire disclosure of which is hereby incorporated by reference herein.

BACKGROUND

The present disclosure generally relates to providing network storage in cloud environments. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. Multiple containers may also be clustered together to perform a more complex function than the respective containers are capable of performing individually. In an example, a container and/or a cluster of containers may be implemented specifically to execute certain specific tasks and/or types of tasks. A scheduler may be implemented to allocate containers and clusters of containers to a host, the host being either a physical host or a virtual host such as a virtual machine. Typically, a container is significantly lighter weight than a virtual machine, and may be hosted in a virtual machine, enabling for additional flexibility and scalability of deployment.

SUMMARY

The present disclosure provides a new and innovative system, methods and apparatus for containerized high-performance network storage. In an example, a first memory is associated with a first host of a plurality of hosts and a second memory is associated with a second host of the plurality of hosts across a network from the first memory. A storage controller and a container scheduler execute in conjunction with one or more processors communicatively coupled with the first memory. The container scheduler instantiates a first storage container on the first host and a second storage container on the second host. The storage controller configures the first storage container as a first storage node of a distributed file system and the second storage container as a second storage node of the distributed file system. The container scheduler instantiates a service container on the first host. The storage controller receives a persistent volume claim associated with the service container and then creates a persistent storage volume in the first storage node based on the persistent volume claim. The persistent storage volume is mapped to the service container, where a content of the persistent storage volume is replicated to the second storage node.

Additional features and advantages of the disclosed method and apparatus are described in, and will be apparent from, the following Detailed Description and the Figures.

DETAILED DESCRIPTION OF EXAMPLE EMBODIMENTS

Figure 1:
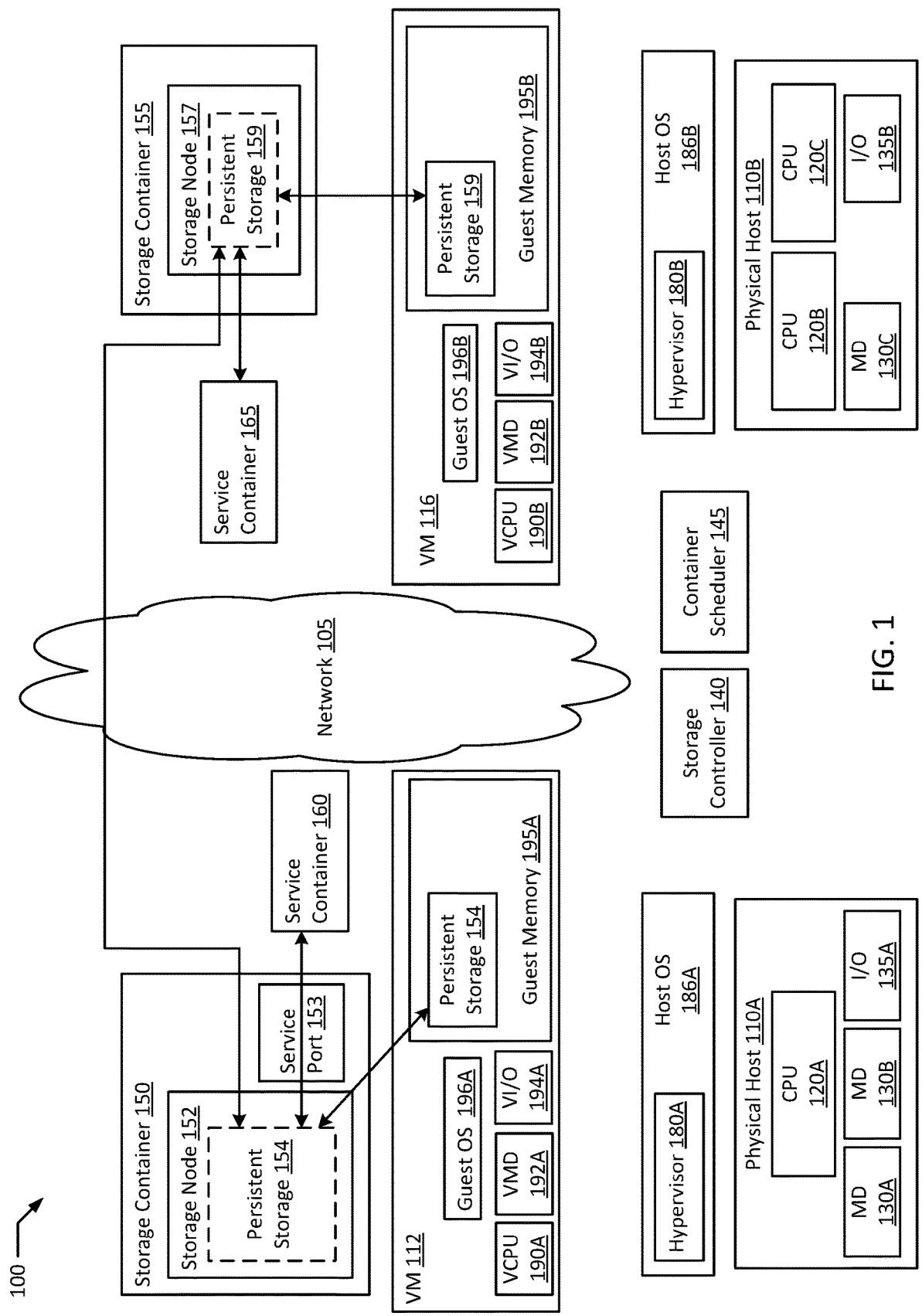
FIG. 1 is a block diagram of a containerized high-performance network storage system according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® Open Shift® executing a containerization runtime such as Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and cleanups with low latency. Containers may enable wide spread, parallel deployment of computing power for specific tasks.

In a typical example, a container may be instantiated to process a specific task and reaped after the task is complete.

Due to economies of scale, containers tend to be more advantageous in large scale hardware deployments where the relatively fast ramp-up time of containers enables for more flexibility for many different types of applications to share computing time on the same physical hardware, for example, in a private or multi-tenant cloud environment. In some examples, where containers from a homogenous source are deployed, it may be advantageous to deploy containers directly on physical hosts. In some multi-tenant clouds, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. In an example, a physical and/or virtual host node may host hundreds of containers, each of which may independently execute tasks.

Many network applications, such as those hosted on containers in multi-tenant clouds, may require the saving of an execution state for a particular user accessing the application. For example, an online game may require the saving of game progress; an e-commerce site may require the saving of payment information and shopping carts; and a social media site may require the saving of interactions with a given post. Many applications may save data in the background for future interactions, for example, customizable interface settings and display preferences. Where settings and/or data require long term storage so that the data is available in future sessions of the application, storage that persists past the termination of a container executing the application may be required. Such applications may typically be referred to as stateful, in contrast to stateless applications where each interaction with the application is effectively independent of a subsequent interaction (e.g., web search, voice over internet protocol, video conferencing). In a typical example, such persistent storage may store data in devices such as hard drive disks ("HDD"), solid state drives ("SSD"), and/or persistent memory (e.g., Non-Volatile Dual In-line Memory Module ("NVDIMM")).

In a typical example, dedicated storage units may be connected to a network with hosts hosting containers executing stateful applications to store the execution states of these applications. In an example, the dedicated storage units may be in the form of Network Attached Storage ("NAS") and/or Storage Area Networks ("SAN"). Both NAS and SAN systems typically include replication of data to prevent against data loss due to a failure in any one device. This replication may be implemented through a redundant array of independent disks ("RAID") setup. RAID arrays may be designed to increase performance, to provide live data backup, or a combination of both. For example, storage throughput may be increased by simultaneously executing two storage operations on two separate disks in a RAID array, storing two files in the time it takes one disk to store one file. Similarly, two copies of the same file may be stored on the two disks resulting in automated backup and replication. In a RAID array designed for data security through replication, each piece of data on a given storage device may be saved in duplicate across at least two physical devices so that if one device fails, the data on that device may be reconstructed from the remaining copies. A RAID array may also be configured such that, while two copies of each file are being written to disk, more total disks are available for use, therefore simultaneously enabling higher throughput and automated replication. A typical NAS device may include numerous storage devices such as HDDs and SSDs that may be arranged in a RAID array to prevent against the failure of any one disk. For example, a NAS device with three HDDs arranged in a RAID array may store each piece of information on two of the three disks so that failure of any one HDD can be recovered from by replacing that HDD and recreating the data on it from the other two disks. A common RAID implementation for a storage node may be what is known as RAID 5 or RAID 6, where an "exclusive or" calculation is used to back up each bit stored to an array. In a RAID 5 example. with the algorithm, a parity bit may be stored one drive in the array calculated from each bit in the same position on the other drives of the array. This is made possible due to the binary nature of data storage, where every bit is either a 0 or a 1. In a simplified example for visualization purposes, disk 1 may store a 1, and disk 2 may store a 0. In the example, because the data in disk 1 and disk 2 is different, a 1 is stored on disk 3. Therefore if disk 2 fails, you can calculate that since you know that disk 1 had different data from disk 2 due to the 1 stored on disk 3, disk 2 must have had a 0. Therefore the data on disc 2 can be recreated if disc 2 fails and requires replacement. Since the order of the disks is known, one disk can always store the result of a chain of exclusive or operations and therefore only the effective capacity of one disc needs to be used to store a "backup" of every other corresponding bit on the other drives. A 3 disk RAID 5 array then results in a 33% replication overhead, while a 5 disk RAID 5 array only requires 1 of the 5 disks' capacity to be lost resulting in 20% replication overhead. However, as arrays increase in size, a second parity bit may be advantageous to guard against the possibility of losing a second disk to failure before the first failed disk is reconstructed, at the cost of another disk worth of overhead on the array. In a SAN system, replication may often be performed over a network with another SAN node, such that data is secure from the loss of not just a physical device but potentially from the loss of an entire data center.

Typically, using NAS or SAN systems for network storage may enable for more efficient and more secure storage usage in a data center. For example, if each physical host and all of the applications executing on the physical host used only storage in the physical host, a large amount of wasted space may be needed to prevent against eventualities where heavy storage usage may occur. In an example, a physical host may use 30% of its storage capacity on average, but may spike to using 90% of its storage capacity during periods of high traffic or when there are execution errors. By configuring the same physical host to only use direct attached storage ("DAS") for core system functions, while moving application specific storage to NAS or SAN systems, the amount of storage on a given application host may be greatly reduced to a very predictable amount. In an example, a data center using typical DAS storage may be constructed with a 70% storage buffer on each physical host to locally absorb any spikes in usage. In the example, each host may typically use 300 GB of a 1 TB storage capacity. Due to the large amounts of storage typically available in a NAS or SAN system, spikes in storage usage by applications may be absorbed as needed, with much less overhead. For example, a 20 TB NAS storage may serve 40 hosts as storage at 300 GB used per host, and still have 8 TB remaining to absorb spikes in usage by individual applications. Therefore 20 TB NAS of storage may be sufficient to cover any realistic spikes in usage rather than 40 TB of DAS storage, or a 50% reduction in overhead. In addition, sharing files between applications on different servers may be streamlined using network storage.

A notable disadvantage of NAS and SAN systems, however, is that an initial access of data across a network is typically orders of magnitude slower than accessing DAS. While the time lost starting any data operation may be inconsequential compared to the transfer time of a large file, for a small file, this initial startup cost may take significantly longer than the entire storage operation. Therefore, especially for systems with high performance requirements where microseconds of latency are significant, centralized storage options like NAS and SAN systems may represent a performance bottleneck. In addition, a given storage node may be compatible with only certain operating systems further reducing deployment flexibility.

"Converged" systems, where compute resources necessary for the efficient execution of an application such as memory, networking and processing capacity, are collocated onto the same physical host may provide the performance required from latency sensitive applications. However, using local resources may also typically result in extra overhead for various resources in a data center due to requirements for contingent capacity. Taking a convergence a step further may include converging resources vistualization into resources accessible by a hypervisor managing resources for numerous guests on a given physical host system. In these types of hyperconverged systems, customized hardware may be used to provide network storage nodes on each physical host, thereby providing the performance advantages of DAS. A major disadvantage, with using customized hardware, however, is the loss of on demand commercial scalability offered by cloud computing. Requiring custom built data centers to efficiently deploy a proprietary application may well defeat the gains in efficiency realized by virtualized application deployments in the first place.

Typically, NAS and SAN storage systems require specialized hardware and networking connections to be incorporated into a data center deployment. A software alternative to physical NAS and SAN systems is distributed file systems such as GlusterFS®, With a distributed file system, artificial storage volumes may be configured from a pool of storage space networked together over a networking protocol such as transmission control protocol/internet protocol ("TCP/IP"). These pooled storage volumes may not share data at comparable rates to a traditional NAS or SAN system, and may therefore result in performance bottlenecks. Distributed file systems do, however, enable the creation of massive storage arrays (e.g., in the petabyte range) from excess capacity on commoditized hardware. A significant disadvantage is scalability and ease of deployment especially in an environment like a multi-tenant cloud. Typically, creation of a distributed file system storage network would require elevated rights and different utilities from, for example, container orchestration. Therefore, when scaling an application through rapid deployment of service containers executing the application, the storage for those containers may not scale with the rollout of the service containers.

The present disclosure aims to address the performance deficiencies of network storage solutions while maintaining the security offered by the data replication features of NAS and SAN systems. In an example, an isolated guest, such as a container, may be constructed to create a virtual storage node using storage capacity directly attached to the container host. The storage container may be configured with a distributed file system to link various storage nodes across a network into a cohesive storage network. The virtual storage node would then offer the data retrieval speeds of localized DAS for any guests such as containers and VMs hosted on the same physical host as the virtual storage node. Meanwhile, files stored in the virtual storage node may be replicated to other nodes of the distributed file system on other hosts to provide security from the failure of a particular storage device. Additional efficiencies in migration and scalability may also be available due to the localized, virtualized storage architecture provided by the virtual storage nodes. By hosting the virtual storage nodes in containers, deployment of storage may also be orchestrated in conjunction with the deployment of containers hosting the services using the storage. Where a network request may incur a minimal 5-10 ms latency, accessing local storage may typically be faster than 1 ms, thereby achieving significant performance advantages over traditional NAS and SAN solutions. Excess storage capacity on each physical host may also be used for replication of storage from other nodes thereby limiting wasted excess capacity. The overhead from executing the storage containers should typically also be minimal since the storage containers are typically deployed in environments where similar containers are deployed to host the services using the storage. In a multi-tenant cloud environment, physical storage may be utilized by tenants executing different environments and operating systems by hosting compatible storage containers inside of virtual machines on top of physical hosts, thereby enabling the same physical host to be quickly transitioned for use between different tenants.

FIG. 1 is a block diagram of a containerized high-performance network storage system according to an example of the present disclosure. The system 100 may include one or more physical hosts 110A-B. Each physical host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-C refers to a volatile or non-volatile memory device, such as RAM, ROM, EEPROM, or any other device capable of storing data. As discussed herein, I/O device 135A-B refer to devices capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each physical host 110A-B, including the connections between a processor 120A and a memory device 130A-B and between a processor 120A and an I/O device 135A may be provided by one or more local buses of suitable architecture, for example, peripheral component interconnect (PCI).

In an example, physical hosts 110A-B may run one or more isolated guests, for example, VMs 112 and 116, storage containers 150 and 155, and service containers 160 and 165. In an example, any of storage and/or service containers 150, 155, 160, and 165 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VMs 112 and 116 may be VMs executing on physical hosts 110A-B. In an example, storage container 150 and service container 160 may execute on VM 112. In an example, storage controller 140 and/or container scheduler 145 may execute either independently or within a container. In an example, any of storage containers 150 and 155 and service containers 160 and 165 may be executing directly on either of hosts 110A-B without a virtualized layer in between. In an example, isolated guests may be further nested in other isolated guests. For example, VMs 112 and 116 may host containers (e.g., storage containers 150 and 155, service containers 160 and 165). In addition, containers and/or VMs may further host other guests necessary to execute their configured roles. For example, a VM (e.g., VM 112 or 116) and/or a container (e.g., storage containers 150 and 155, service containers 160 and 165) may further host a Java® Virtual Machine ("JVM") if execution of Java® code is necessary.

System 100 may run one or more VMs (e.g., VMs 112 and 116), by executing a software layer (e.g., hypervisor 180A-B) above the hardware and below the VMs 112 and 116, as schematically shown in FIG. 1. In an example, the hypervisors 180A-B may be components of respective host operating systems 186A-B executed by the system 100. In another example, the hypervisors 180A-B may be provided by an application running on respective operating systems 186A-B, or may run directly on respective physical hosts 110A-B without an operating system beneath them. Hypervisor 180A-B may virtualize the physical layer, including processors, memory, and I/O devices, and present this virtualization to VMs 112 and 116 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OSs 186A-B without an intervening layer of virtualization.

In an example, a VM 112 may be a virtual machine and may execute a guest operating system 196A which may utilize the underlying VCPU 190A, VMD 192A, and VI/O 194A. One or more isolated guests (e.g., storage container 150 and service container 160) may be running on VM 112 under the respective guest operating system 196A. Processor virtualization may be implemented by the hypervisor 180A scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host operating system 186A. In an example, storage container 150 and service container 160 running on VM 112 may be dependent on the underlying hardware and/or host operating system 186A. In another example, storage container 150 and/or service container 160 running on VM 112 may be independent of the underlying hardware and/or host operating system 186. In an example, storage container 150 and service container 160 running on VM 112 may be compatible with the underlying hardware and/or host operating system 186A. Additionally, storage container 150 and/or service container 160 running on VM 112 may be incompatible with the underlying hardware and/or OS. The hypervisor 180A may manage memory for the host operating system 186A as well as memory allocated to the VM 112 and guest operating system 196A such as guest memory 195A provided to guest OS 196. In an example, VM 116 and its associated components guest OS 196B, VCPU 190B, VMD 192B, VI/O 194B, and guest memory 195B may perform similar corresponding roles to the components in VM 112. Similarly, hypervisor 180B and host OS 186B may function in similar roles as related to VM 116 as hypervisor 180A and host OS 186A do to VM 112. In an example, storage container 155 and service container 165 may execute on VM 116 or directly on physical host 110B.

In an example, network 105 may be any form of suitable network for enabling communications between computing devices, for example, a public network (e.g., the Internet), a private network (e.g., a local area network (LAN) or wide area network (WAN)), or a combination thereof. In an example, storage container 150 and storage container 155 may be separated by network 105. In an example, storage container 150 may host storage node 152 of a distributed file system while storage container 155 hosts storage node 157 of the distributed file system. In the example, storage node 152 may host a persistent storage 154 associated with service container 160, and storage node 157 may host a persistent storage 159 associated with service container 165. In an example, storage container 150 may be configured with a service port 153 as a networking address through which service container 160 may communicate with and access persistent storage 154. In an example, an additional port may be opened for each additional service container to persistent storage volume combination hosted by the storage node. In an example, storage node 152 may utilize storage provided to storage container 150 by guest memory 195A, thereby storing persistent storage 154 in guest memory 195A. In another example, storage node 152 may be configured to directly access MD 130A-B, and may store persistent storage 154 on MD 130A, for example, where storage container 150 is hosted directly on bare metal of physical host 110A. In an example, storage controller 140 may be a storage controller for a distributed file system such as GlusterFS®, In the example, storage controller 140 may manage the deployment of storage nodes (e.g., storage nodes 152 and 157) and the allocation of persistent storages (e.g., persistent storage 154 and 159) in system 100. In an example, container scheduler 145 may be a component responsible for assigning compute tasks executed in containers to various host nodes (e.g., VMs 112 and 116, physical hosts 110A-B). In an example, container scheduler 145 and/or storage controller 140 may be included in a container orchestrator (e.g., Kubernetes®).

Figure 2:
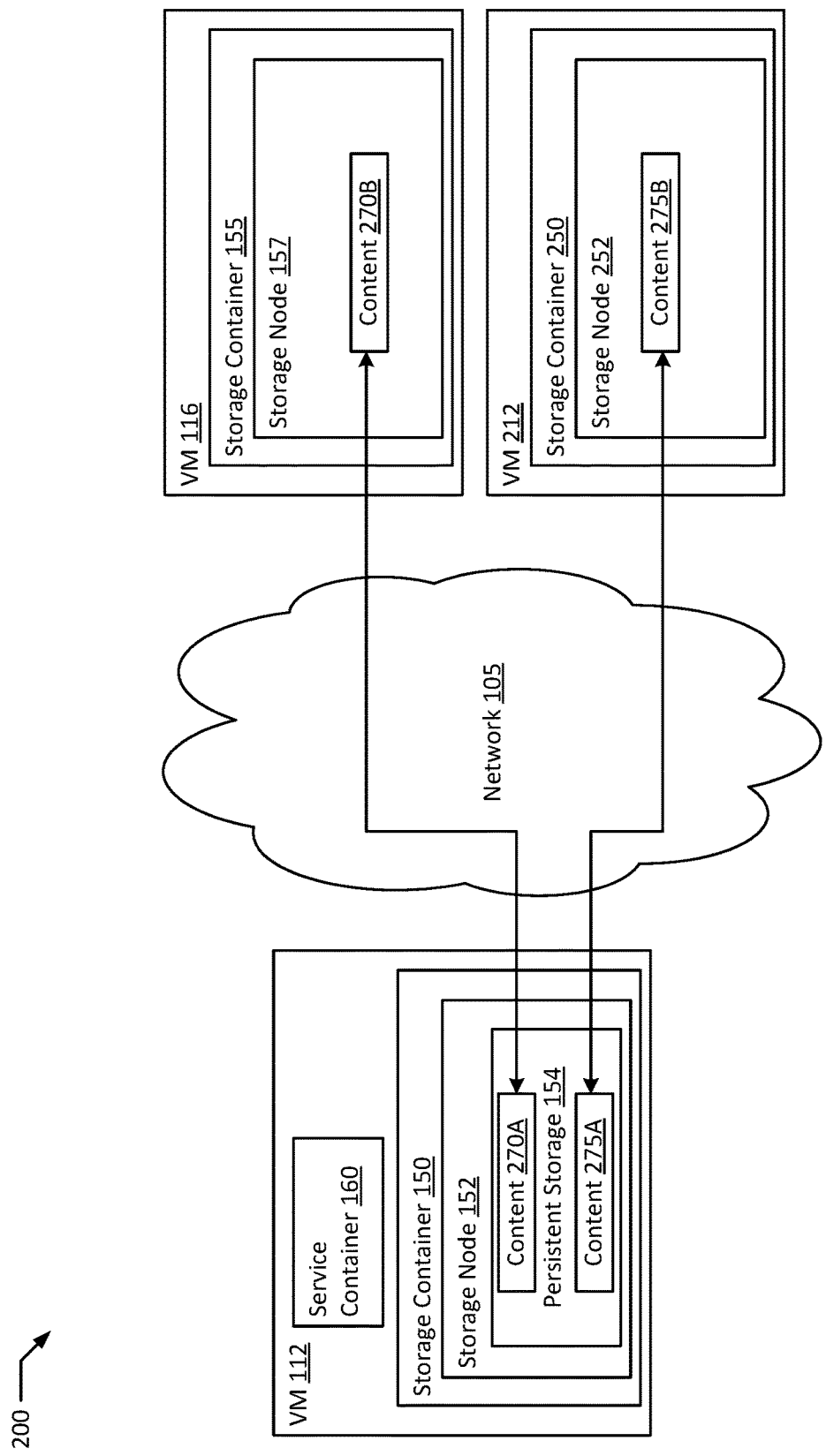
FIG. 2 is a block diagram illustrating data replication in a containerized high-performance network storage system according to an example of the present disclosure.

FIG. 2 is a block diagram illustrating data replication in a containerized high-performance network storage system according to an example of the present disclosure. Illustrated system 200 may be an extension of system 100, where VMs 112, 116, and 212 host storage containers 150, 155, and 250 respectively. In an example, each of storage containers 150, 155, and 250 may be configured to be a storage node of a distributed file system (e.g., storage nodes 152, 157, and 252). In an example, persistent storage 154 is allocated on storage node 152, and contents 270A and 275A are stored in persistent storage 154. In an example, content 270A is replicated to storage node 157 as content 270B, and content 275A is replicated to storage node 252 as content 275B over network 105. In an example, the replicated copies (e.g., contents 270B and 275B) may be stored in a persistent storage on respective storage nodes 157 and 252. In another example, the replicated copies (e.g., contents 270B and 275B) may be stored separate from any persistent storages located on storage nodes 157 and 252 (e.g., in unused space or dedicated backup space). In an example, a full copy of persistent storage 154 may be backed up to one storage node (e.g., storage node 157). In another example, the contents of persistent storage 154 may be split among multiple storage nodes, resulting in higher throughput for writing the data in parallel as well as lower overhead on each destination storage node, thereby resulting in higher utilization of storage from more granular usage of the available storage space on each storage node. In some examples, multiple full copies of persistent storage 154 may be made either directly or in "striped" fashion to storage nodes 157 and 252. An example of striped deployment may include replicating every other file and/or every other sector to a different storage node, such that the total loss of any one storage node does not result in any data loss.

In an example, persistent storage 154 may be reconstructed in its entirety on a fourth storage node from contents 270B and 275B in storage nodes 157 and 252. In an example a reconstructed persistent storage 154 on the fourth storage node may be accessed by a new service container instantiated on the same physical host as the fourth storage node. In an example, flash memory (e.g., SSDs) may be advantageous for storage nodes as a balance between performance and persistence. In another example, HDDs may be selected for cost efficiency. In yet another example, higher performance may be achieved using RAM to store data for storage nodes 152, 157, and 252, and replication may provide sufficient persistence and security against data loss on any one storage node due to a loss of power. In an example, periodic replication of data to a long term storage (e.g., tape backup) may provide additional security against data loss.

Figure 3:
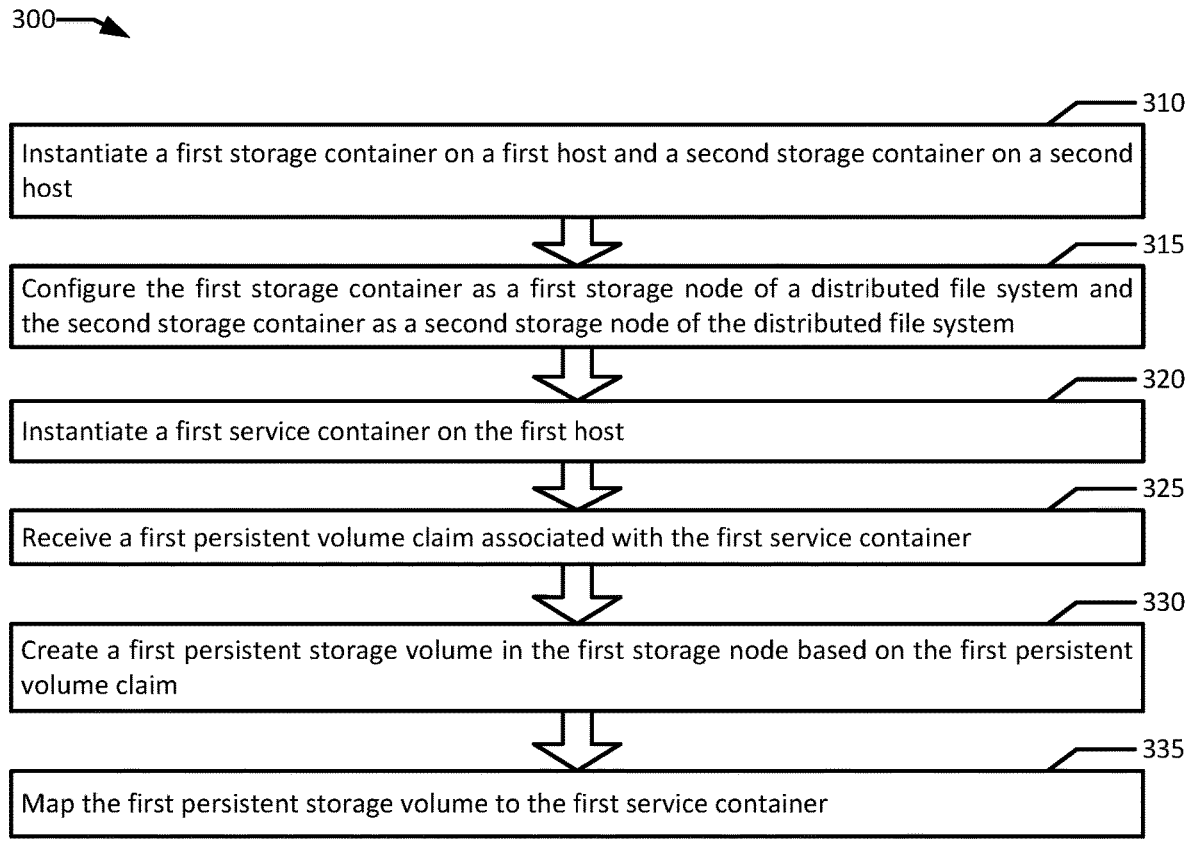
FIG. 3 is a flowchart illustrating an example of containerized high-performance network storage according to an example of the present disclosure.

FIG. 3 is a flowchart illustrating an example of containerized high-performance network storage according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a storage controller 140 and a container scheduler 145.

Example method 300 may begin with instantiating a first storage container on a first host and a second storage container on a second host (block 310). In an example, storage container 150 may be instantiated on VM 112, and storage container 155 may be instantiated on VM 116 by container scheduler 145. In an example, storage controller 140 may instruct container scheduler 145 to instantiate storage containers 150 and 155.

The first storage container is configured as a first storage node of a distributed file system and the second storage container as a second storage node of the distributed file system (block 315). In an example, storage controller 140 configures storage container 150 as storage node 152, and storage container 155 as storage node 157, such that a distributed file system includes storage nodes 152 and 157. In an example, the distributed file system enables storage nodes 152 and 157 to share data over network 105 as nodes of the same file system. In the example, a contents of storage node 152 (e.g., contents 270A and 275A) may be replicated over the distributed file system to other storage nodes (e.g., storage nodes 157 and 252). In an example, content 270A may be replicated to multiple storage nodes (e.g., both storage nodes 157 and 252).

A first service container is instantiated on the first host (block 320). In an example, container scheduler 145 instantiates service container 160 on VM 112. In an example, service container 160 may host an online game. A first persistent volume claim associated with the first service container is received (block 325). In an example, during instantiation, service container 160 may request storage controller 140 to provide service container 160 with a persistent storage volume via a persistent volume claim. For example, the online game executing on service container 160 may require storage for storing user progress in the game.

A first persistent storage volume is created in the first storage node based on the first persistent volume claim (block 330). In an example, storage controller 140 creates persistent storage 154 on storage node 152 as a persistent storage volume for service container 160 based on the persistent volume claim. In an example, prior to selecting storage node 152 as the storage node for persistent storage 154 associated with service container 160, storage controller 140 may first evaluate whether storage node 152 meets a performance threshold required by service container 160. For example, the persistent volume claim may include a minimum latency requirement, and latency between service container 160 and storage node 152 may be evaluated to determine whether storage node 152 provides adequate response times. Alternatively, storage controller 140 may determine that storage node 152 is appropriate for service container 160 based on physical proximity. For example, data centers are often organized in progressing degrees of separation by node, rack, zone, and data center, with optional additional levels of granularity such as floor and/or region. Each of these organizational levels may be represented with a respective identifier. When selecting storage node 152 to host persistent storage 154, storage controller 140 may select for a storage node sharing a sufficient set of physical location identifiers with service container 160 requesting the persistent storage volume. For example, locating persistent storage 154 on the same rack with service container 160 may be sufficient for some purposes, while other applications may require persistent storage 154 to be located in the same host as service container 160 (e.g., sharing a node identifier for VM 112).

The first persistent storage volume is mapped to the first service container (block 335). In an example, after persistent storage 154 is initialized, persistent storage 154 may be mapped to service container 160 as a persistent storage volume. In an example, persistent storage 154 may be attached to service container 160 to create a logical connection between them. After the logical connection is established, persistent storage 154 may be mounted and/or mapped as a storage device through the operating system of service container 160, such that service container 160's operating system recognizes persistent storage 154 as a valid location to store files. In an example, persistent storage 154 may be mapped as a drive, a directory, a file system, or any other recognizable storage container in service container 160. Additionally, a content of the first persistent storage volume may be replicated to the second storage node. Replication may be performed either through a true backup, or an "exclusive or" or other algorithmic backup such that the data may be reconstructed. In the example above, content 270A stored on persistent storage 154 may be replicated to storage node 157 and/or storage node 252. In an example, mapping persistent storage 154 to service container 160 may include opening a service port 153 on storage container 150 for communications between service container 160 and persistent storage 154. In an example, content 270A may be encrypted. In an example, persistent storage 154 may remain after service container 160 exits, and persistent storage 154 may be mapped to a new service container replacing service container 160. For example, service container 160 may exit and a new version of service container 160 may replace the previous container.

In an example, the contents of persistent storage 154 (e.g., contents 270A and 275A) are replicated to storage nodes 157 and 252 as contents 270B and 275B. In an example, a full copy of persistent storage 154 may be created in storage node 252 based on content 270A in storage node 152, or content 270B in storage node 157. In the example, persistent storage 154 may be migrated to storage node 252 by fully replicating persistent storage 154 to storage node 252. In another example, an updated version of storage container 150 may be deployed on VM 112. In the example, persistent storage 154 may be migrated to the updated storage container by migrating the contents of persistent storage 154 to a new storage node on the updated storage container. Alternatively, persistent storage 154 may be recreated in the new storage node from contents 270B and 275B over network 105. In an example, the recreated persistent storage 154 may be seamlessly mapped to service container 160. In an example, the replication features of the distributed file system may enable the dynamic migration of persistent storage volumes independently of the storage node and/or storage container hosting the persistent storage volume. In an example, data for a user may be saved by a service container 160 in persistent storage 154 on VM 112. The next time that user logs into the application, service container 160 may have been deprecated, and the user may have logged into a new service container on a new VM instead. A storage node on the new VM may then being replicating a new version of persistent storage 154 onto the new VM to provide high performance local storage for the user's new session. By coupling the distributed file system with the flexibility of container deployments, both service containers and storage containers may be updated and migrated at will due to the modularity of containerize deployments.

Figure 4:
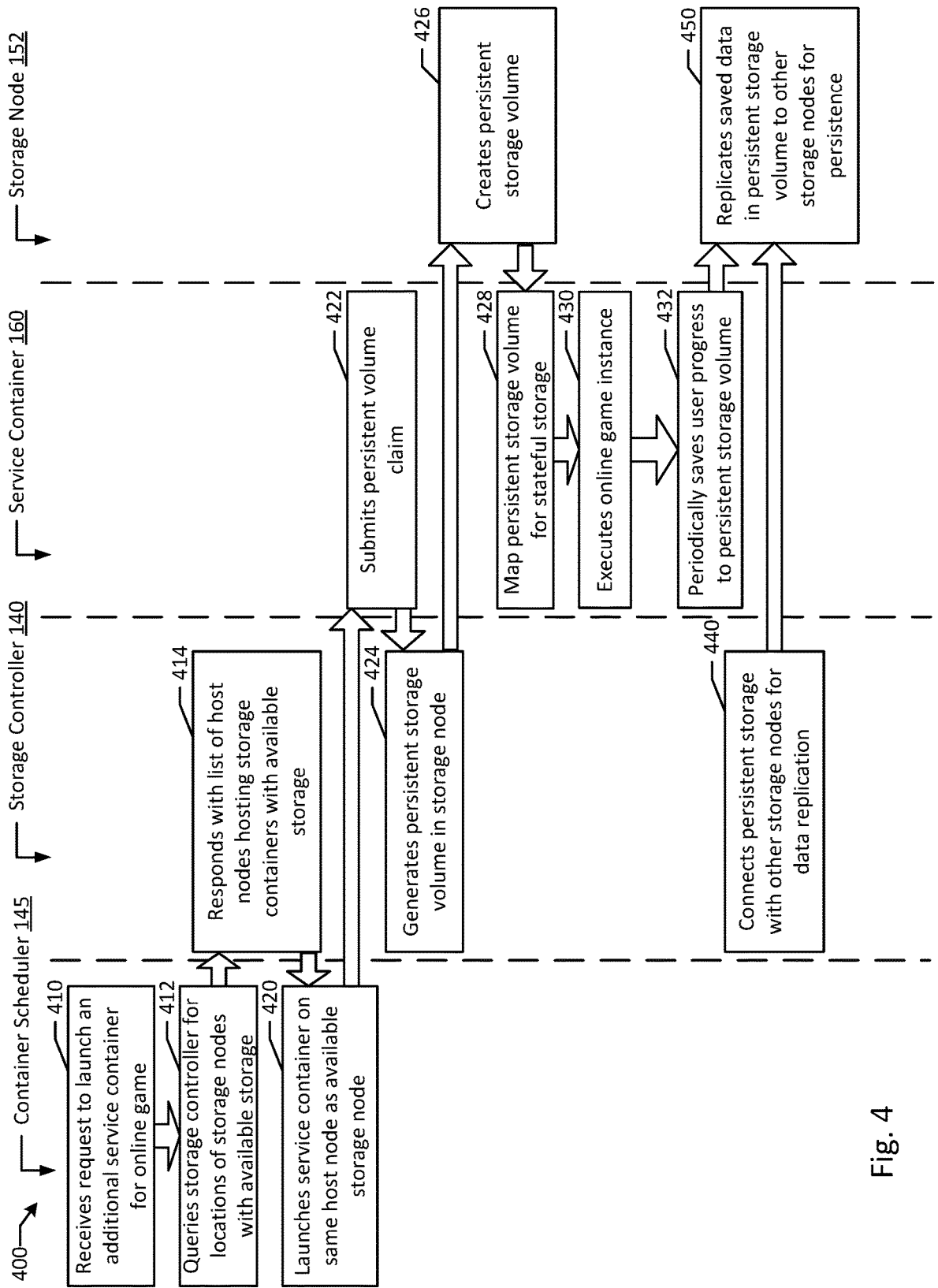
FIG. 4 is flow diagram of an example of containerized high-performance network storage utilizing an existing storage node according to an example of the present disclosure.

FIG. 4 is flow diagram of an example of containerized high-performance network storage utilizing an existing storage node according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, container scheduler 145 and storage controller 140 configure a persistent storage volume for service container 160 using storage node 152.

In example system 400, container scheduler 145 receives a request to launch an additional service container for an online game (block 410). In the example, container scheduler 145 may query storage controller 140 for physical locations of storage nodes with available storage (block 412). Storage controller 140 may then respond with a list of host nodes hosting storage containers with available storage (block 414). In the example, storage controller 140 may further provide node, rack, and/or zone identifiers for the available storage containers. In an example, container scheduler 145 may then determine an appropriate physical location for deploying the new service container based on host capacity for new containers on the hosts in the list provided by the storage controller 140. Container scheduler 145 may then select VM 112 as a host with sufficient capacity. In an example, container scheduler 145 launches service container 160 on VM 112, the same host node as available storage node 152 (block 420).

In an example, service container 160 submits a persistent volume claim (block 422). Storage controller 140 then instructs storage node 152 to generate a persistent storage 154 as a persistent storage volume for service container 160 (block 424). Storage node 152 may then create persistent storage 154 (block 424 in an example, service container 160 maps persistent storage 154 for stateful storage of the online game's execution state (block 428). In the example, service container 160 then executes the online game instance (block 430). As a result, service container 160 periodically saves user progress to persistent storage 154 (block 432). In an example, storage controller 140 connects persistent storage 154 with storage nodes 157 and 252 for data replication (block 440). In the example, storage node 152 replicates saved data (e.g., contents 270A and 270B) to storage nodes 157 and 252 for persistence and security (block 450).

Figure 5:
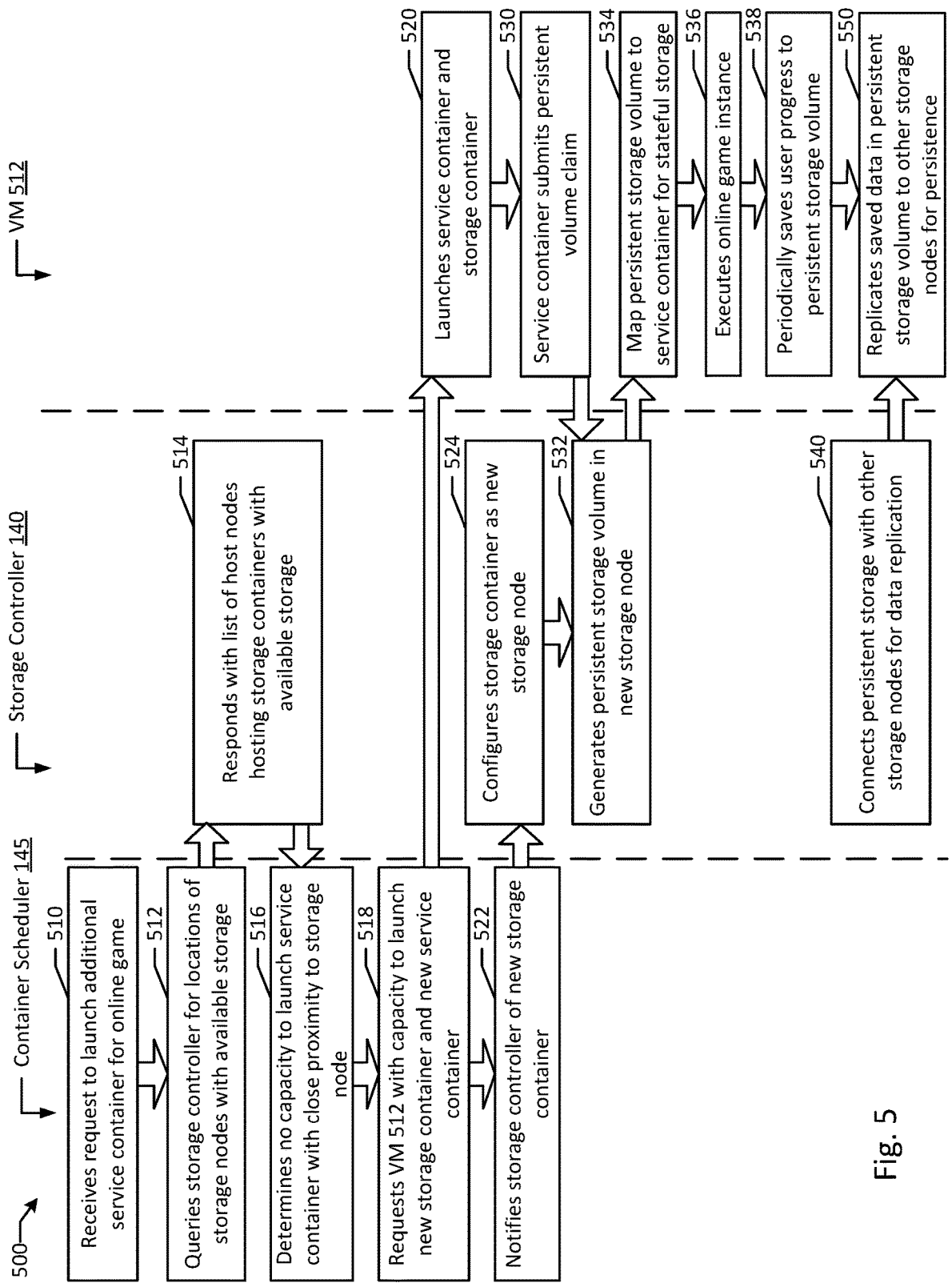
FIG. 5 is flow diagram of an example of containerized high-performance network storage creating a new storage node according to an example of the present disclosure.

FIG. 5 is flow diagram of an example of containerized high-performance network storage creating a new storage node according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, container scheduler 145, storage controller 140, and VM 512 combine to provision persistent network storage where existing storage nodes fail to meet demands in a new persistent volume claim.

In example system 500, container scheduler 145 receives a request to launch yet another additional service container for the online game (block 510). In an example, container scheduler 145 again queries storage controller 140 for locations of storage nodes with available storage (block 512). In response, storage controller 140 sends a list of host nodes hosting storage containers with available storage (block 514). In an example, container scheduler 145 determines that there is no capacity to launch a service container with close physical proximity to any available storage node (block 516). Container scheduler 145 may then request VM 512 with capacity to launch both a new storage container and a new service container to launch both (block 518). In an example, container scheduler 145 then notifies storage controller 140 about the new storage container on VM 512 (block 522). In an alternative example, container scheduler 145 may determine that VM 116 is on the same rack as VM 512, and therefore offers sufficient performance to meet the new service container's storage performance threshold. In such an example, container scheduler 145 may instruct VM 512 to only instantiate a service container, and the new service container may be mapped to persistent storage 159 on VM 116.

In the illustrated example system 500, VM 512 first launches both a new service container and a new storage container (block 520). Storage controller 140 also configures the new storage container as a new storage node of the distributed file system (block 524). In an example, the new service container on VM 512 submits a persistent volume claim to storage controller 140 (block 530). In response, storage controller 140 generates a new persistent storage volume in the new storage node (block 532). In an example, storage controller 140 may generate the new persistent storage volume in the new storage node after determining that existing storage nodes 152 and 157 fail to meet the performance thresholds in the new persistent volume claim. In an example, the new storage container may also be instantiated after storage controller 140 directs container 145 to instantiate a new storage container based on lacking capacity in existing storage nodes that meet the performance threshold of the new persistent volume claim to fulfill the request. After the new persistent storage volume is generated, the persistent storage volume is mapped to the new service container on VM 512 for stateful storage of data (block 534). In an example, after mounting the persistent storage volume, the new service container executes a new online game instance (block 536). The new service container on VM 512 then periodically saves user progress to the new persistent storage volume on VM 512 (block 538). Storage controller 140 may connect the persistent storage volume on VM 512 to other storage nodes (e.g., storage nodes 152 and 157) for data replication (block 540). In an example, the storage node on VM 512 then replicates saved data in the new persistent storage volume to storage nodes 152 and/or 157 for data persistence (block 550).

In an example, a service container for the online game may be instantiated on VM 212. In the example, storage controller 140 may determine that storage nodes 152 and 157 fail to meet a performance threshold of a persistent volume claim by the service container on VM 212. Storage controller 140 may then request container scheduler 145 to instantiate storage container 250 on VM 212, which is then configured into storage node 252 of the distributed file system. In an example, storage container 250 is instantiated sharing at least one of a node, a rack, and a zone with the service container on VM 212. A new persistent storage volume on storage node 252 is then mounted to the service container on VM 212.

Figure 6:
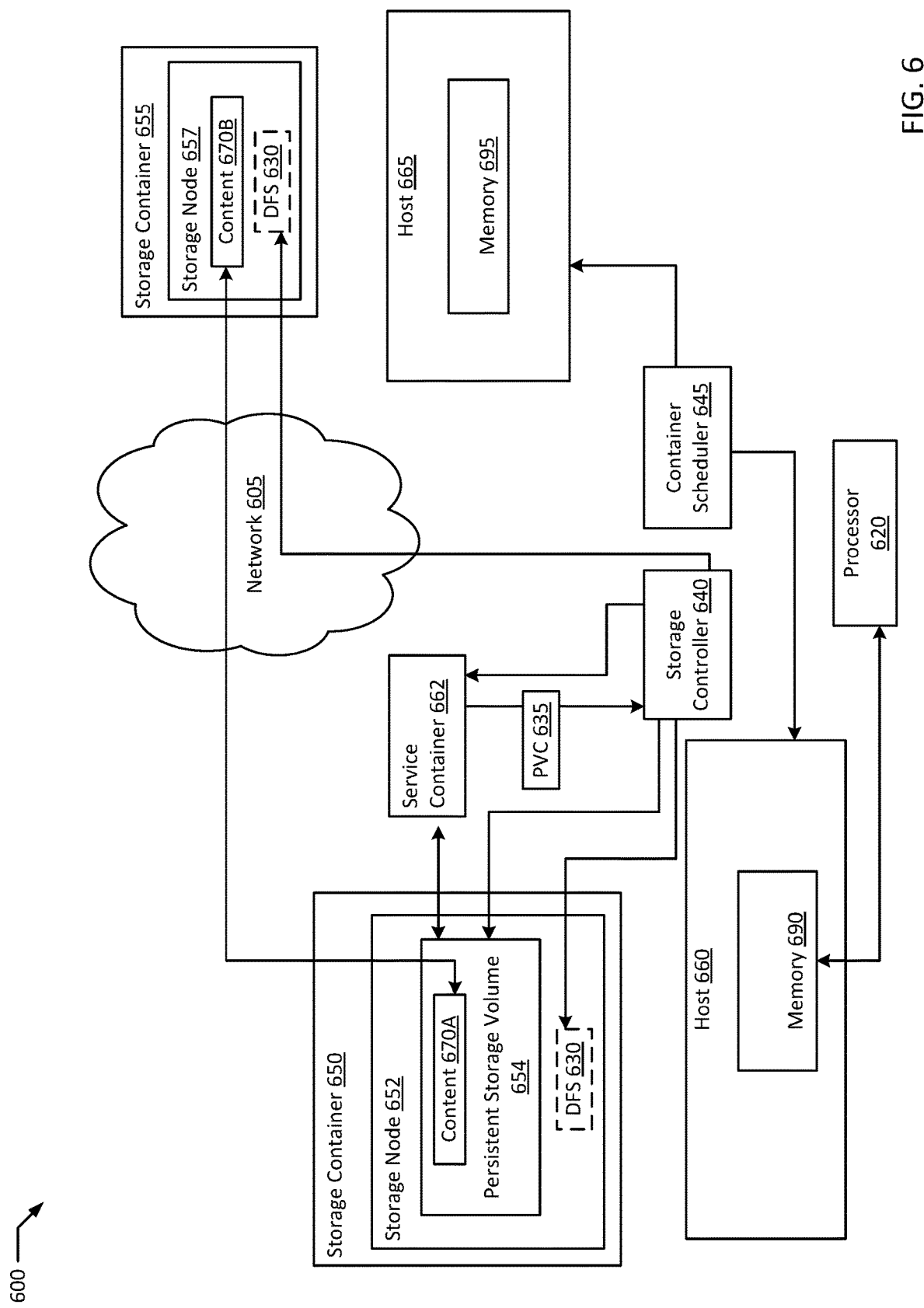
FIG. 6 is a block diagram of an example containerized high-performance network storage according to an example of the present disclosure.

FIG. 6 is a block diagram of an example containerized high-performance network storage according to an example of the present disclosure. Example system 600 includes memory 690 and memory 695 across network 605 from memory 690. Storage controller 640 and container scheduler 645 execute on processor 620. Host 660 is associated with memory 690 and host 665 is associated with memory 695. Processor 620 is communicatively coupled with memory 690 and executes to instantiate, by container scheduler 645, storage container 650 on host 660 and storage container 655 on host 665. Storage controller 640 configures storage container 650 as storage node 652 of distributed file system 630 and storage container 655 as storage node 657 of the distributed file system ("DFS") 630. Container scheduler 645 instantiates first service container 662 on host 660. Storage controller 640 receives persistent volume claim ("PVC") 635 associated with service container 662. Storage controller 640 creates persistent storage volume 654 in storage node 652 based on persistent volume claim 635. The persistent storage volume 654 is mapped to service container 662, where content 670A of persistent storage volume 654 is replicated to storage node 657 (e.g., as content 670B).

Figure 7:
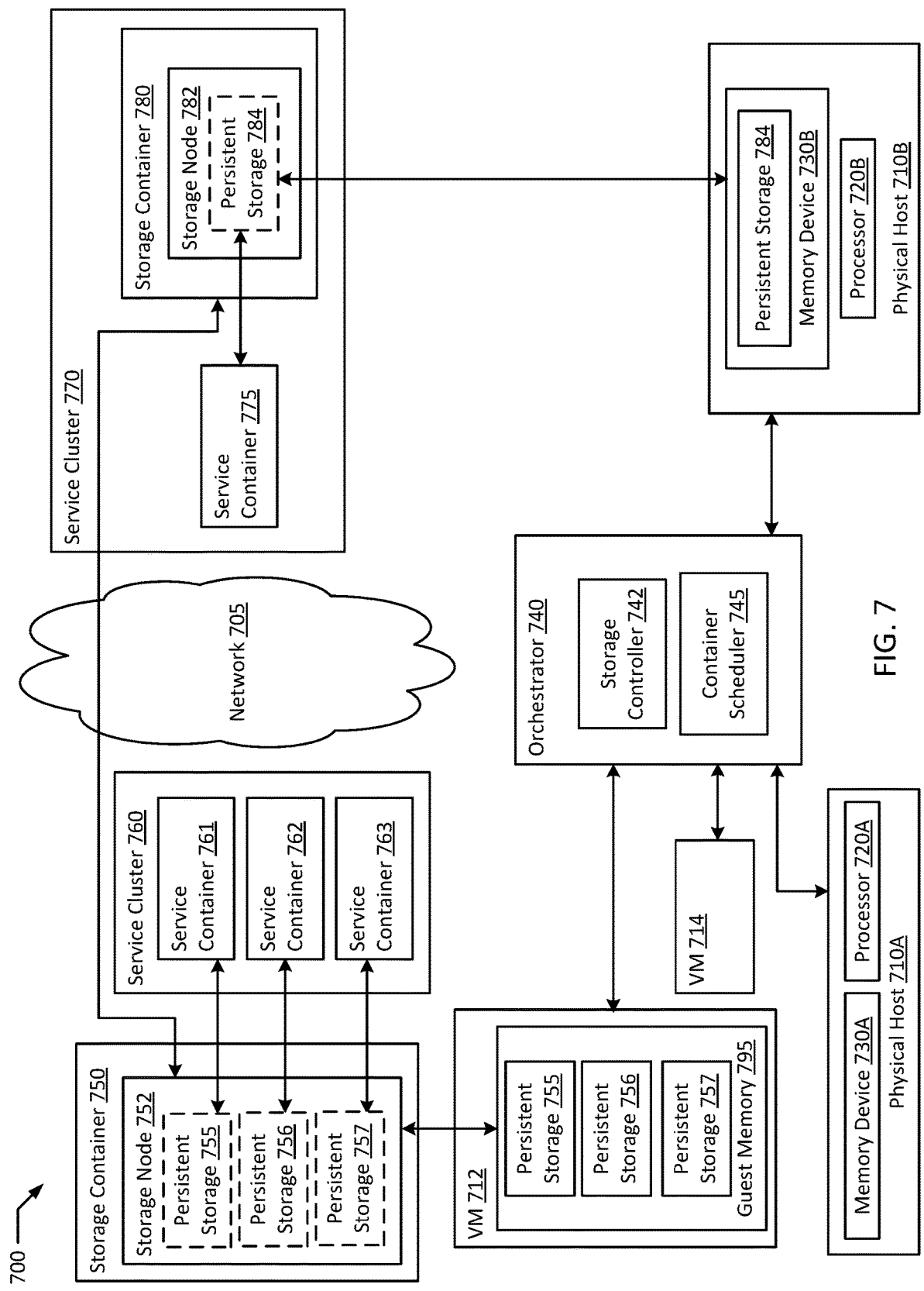
FIG. 7 is a block diagram an orchestrated containerized high-performance network storage system according to an example of the present disclosure.

FIG. 7 is a block diagram an orchestrated containerized high-performance network storage system according to an example of the present disclosure. In an example, physical hosts 710A-B, processors 720A-B, memory devices 730A-B, network 705, storage controller 742, container scheduler 745, VMs 712 and 714, and guest memory 795 of system 700 may all be similar in form and function to their respective counter parts physical hosts 110A-B, processors 120A-C, memory devices 130A-C, network 105, storage controller 140, container scheduler 145, VMs 112 and 114, and guest memory 195 in system 100. In an example, storage container 750 deployed on VM 712 may be similar to storage container 150. In an example, storage container may host storage node 752 similar to storage node 152, which may in turn host one or more persistent storage volumes (e.g., persistent storages 755-757) each similar to persistent storage 154. In an example, persistent storages 755-757 may be stored in guest memory 795, which may in turn be physically stored in memory device 730A. In an example, VM 712 may share physical host 710A with VM 714.

In an example, orchestrator 740 may be a comprehensive containerization management suite (e.g., Red Hat® OpenShift®, Kubernetes®) including storage controller 742 and container scheduler 745. In an example, orchestrator 740 may allow for the discovery of container deployment solutions to efficiently locate service containers (e.g., service containers 761-763) in close physical and/or network proximity to persistent storage volumes associated with each service container (e.g., persistent storages 755-757). In the example, a comprehensive service such as an e-commerce website may include several standalone components. In an example, service cluster 760 may be a group of associated service containers (e.g., service containers 761-763) that combine to deliver a more comprehensive service. For example, service container 761 may provide a product search service, service container 762 may provide a shopping cart service, and service container 763 may provide a payment service. In an example, service containers 761-763 may map associated persistent storages 755-757 on storage node 752 located on a shared physical host 710A. In an example, service cluster 760 may be deployed to VM 714 rather than VM 712 due to a shortage of compute resources (e.g., CPU, memory, disk, persistent memory, network bandwidth, etc.) on VM 712.

In an example, service cluster 770 may include both service container 775 as well as storage container 780, allowing service container 775 to be co-deployed with its persistent storage volume (e.g., persistent storage 784 on storage node 782 on storage container 780). In an example, storage node 782 may be part of a shared distributed file system with storage node 752, allowing storage nodes 782 and 752 to back up each other's data. In an example, service cluster 770 is deployed directly on the bare metal on physical host 710B. In the example, physical host 710B may execute a container engine (e.g., Docker®) to provide a runtime environment for service cluster 770. In the example, storage node 782 and thereby persistent storage 784 may be physically stored on memory device 730B.

Figure 8:
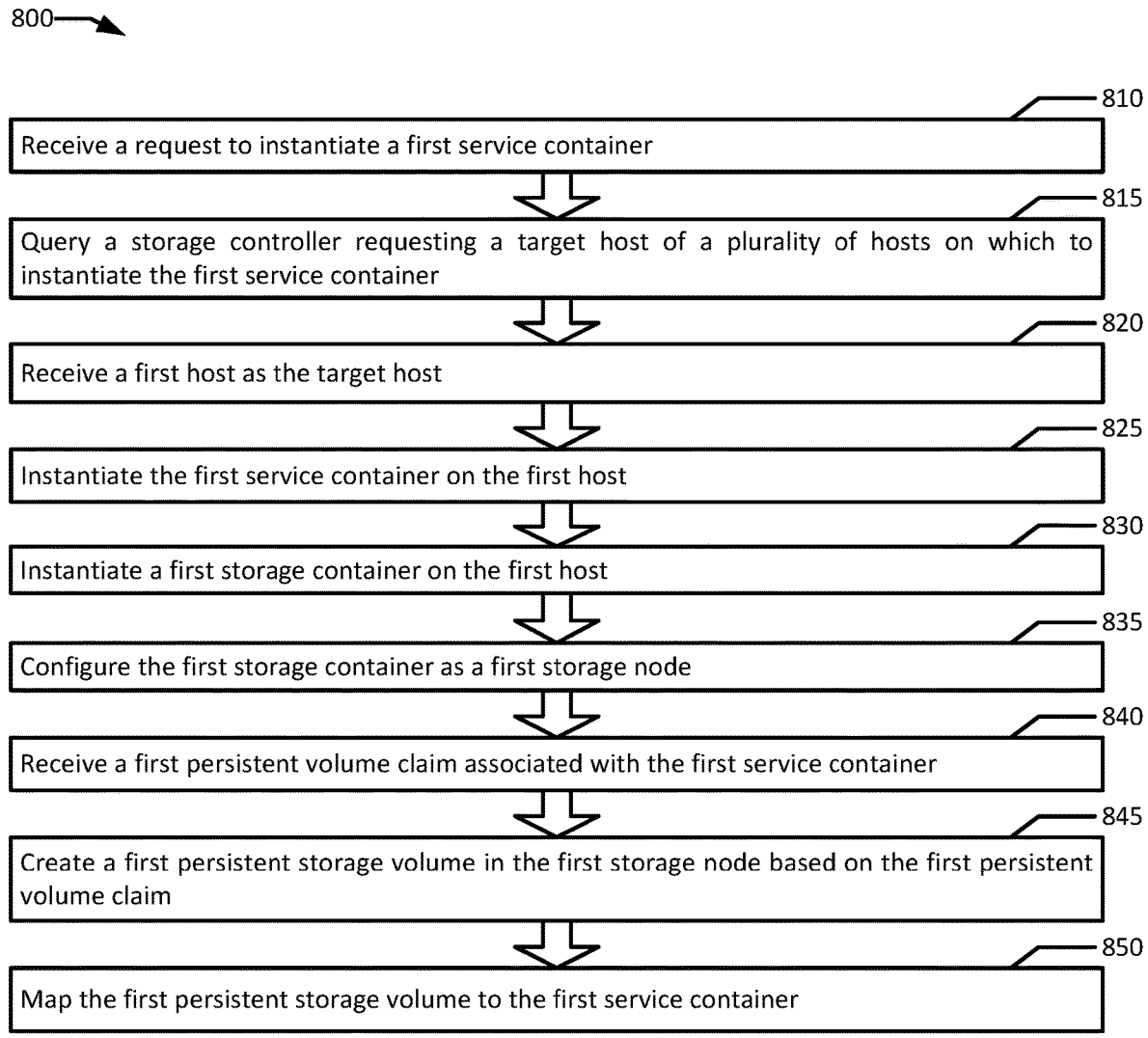
FIG. 8 is a flowchart illustrating an example of orchestrated containerized high-performance network storage according to an example of the present disclosure.

FIG. 8 is a flowchart illustrating an example of orchestrated containerized high-performance network storage according to an example of the present disclosure. Although the example method 800 is described with reference to the flowchart illustrated in FIG. 8, it will be appreciated that many other methods of performing the acts associated with the method 800 may be used. For example, the order of some of the blocks may be changed, certain blocks may be combined with other blocks, and some of the blocks described are optional. The method 800 may be performed by processing logic that may comprise hardware (circuitry, dedicated logic, etc.), software, or a combination of both. In an example, the method 800 is performed by an orchestrator 740.

Example method 800 may begin with receiving a request to instantiate a first service container (block 810). For example, container scheduler 745 of orchestrator 740 may receive a request to instantiate service container 761. In an example, service container 761 may be part of a container cluster (e.g., service cluster 760) which may be deployed together to provide a complex service (e.g., a whole e-commerce website). A storage controller is queried, requesting a target host of a plurality of hosts on which to instantiate the first service container (block 815). In an example, container scheduler 745 of orchestrator 740 may query storage controller 742 or orchestrator 740 to request a target host (e.g., VM 714) of a plurality of hosts (e.g., physical hosts 710A-B, VMs 712 and 714) on which to instantiate service container 761. A first host is received as the target host (block 820). In an example, VM 714 is received by container scheduler 745 as the target host. In an example, container scheduler 745 may include in its query to storage controller 742, information regarding persistent storage requirements of service container 761, for example, retrieved from metadata of an image file associated with service container 761. In an example, storage controller 742's response of VM 714 as the target node may be based on VM 714's proximity to storage node 752, for example, due to VM 714 sharing physical host 710A with VM 712, which in turn hosts storage container 750 and storage node 752.

The first service container is instantiated on the first host (block 825). In an example, service container 761 is instantiated by orchestrator 740, (e.g., by container scheduler 745) on VM 714. In an example, service container 761 may be associated with persistent storage 755. In the example, a new service container may be launched replacing service container 761, for example, as part of an update to a service provided by service container 761. In the example, persistent storage 755 may be mapped to the new service container replacing service container 761. In an example, orchestrator 740 instantiates service container 775 on host 710B based on determining whether storage node 752 meets a performance threshold of service container 775 and service container 775 issues a second persistent volume claim (e.g., for persistent storage 784). In an example, the performance threshold is determined based on a network latency between the storage node 752 and service container 775 and/or a physical location of storage node 752 and a physical location of service container 775. In an example, orchestrator 740 is configured to deploy a container cluster (e.g., service cluster 770) including storage container 780 and service container 775 on a single host (e.g., physical host 710B).

A first storage container is instantiated on the first host (block 830). In an example, the storage controller requests instantiation of the first storage container. In an example, orchestrator 740 instantiates storage container 750 on VM 714 based on a request, for instantiation by storage controller 742. In an example, storage container 750 is instantiated on VM 712 which shares the same physical host 710A as VM 714. In an example, a third storage container is instantiated on VM 712 as an updated version of storage container 750, and persistent storage 755 is migrated to the third storage container from storage container 750. In an example, the third storage container may be an updated version of storage container 750.

The first storage container is configured as a first storage node (block 835). In an example, storage container 750 is configured as storage node 752. In an example, storage node 752 and storage node 782 located across network 705 from storage node 752 are configured as storage nodes. In an example, contents of storage nodes 752 and 782 may be replicated to each other and other nodes of the distributed file system for data security and integrity. In an example, memory device 730B across network 705 from guest memory 795 is associated with physical host 710B, and orchestrator 740 further executes to instantiate storage container 780 on memory 730B. In the example, storage container 780 is configured as storage node 782 and both storage nodes 752 and 782 are added to a distributed file system. In the example, orchestrator 740 creates persistent storage 784 in storage node 782 mapped to service container 775 and a contents of persistent storage 784 are replicated to the storage node 752. In an example a third storage node may be instantiated and added to the distributed file system. In the example, one or more complete copies of the contents of persistent storage 784 may be replicated between storage node 752 and the third storage node. In the example, with additional storage nodes in the distributed file system, additional replicated copies of contents such as persistent storage 784 may be distributed among the various nodes for performance and/or data security. In an example, a replicated copy of persistent storage 784 may be associated with a new instance of service container 775 launched on a host with closer network proximity (e.g., lower network latency) to a host of the replicated copy than to storage node 782.

A first persistent volume claim associated with the first service container is received (block 840). In an example, orchestrator 740 receives a persistent volume claim (e.g., for persistent storage 755) from service container 761. A first persistent storage volume is created in the first storage node based on the first persistent volume claim (block 845). In an example, persistent storage 755 is created in storage node 752 based on the persistent volume claim from service container 761. The first persistent storage volume is mapped to the first service container (block 850). In an example, persistent storage 755 is mapped to service container 761. In an example, contents of persistent storage 755 are replicated to storage node 782.

In an example, persistent storage 784 is created in storage node 782 and then mapped to service container 775. In the example, another storage container is instantiated, configured as an additional node of the distributed file system including storage nodes 752 and 782, and a persistent storage volume created in the additional node is mapped to service container 775. For example, storage node 782 may have reached capacity. In an example, the storage container hosting the additional storage node is instantiated with a shared node, a shared rack, and/or a shared zone with service container 775, for example, to provide for physical proximity between the additional storage node and service container 775. In an example, service cluster 760 is instantiated and each of service containers 761-763 maps a respective persistent storage volume (e.g., persistent storages 755-757) on the storage node 752.

Figure 9:
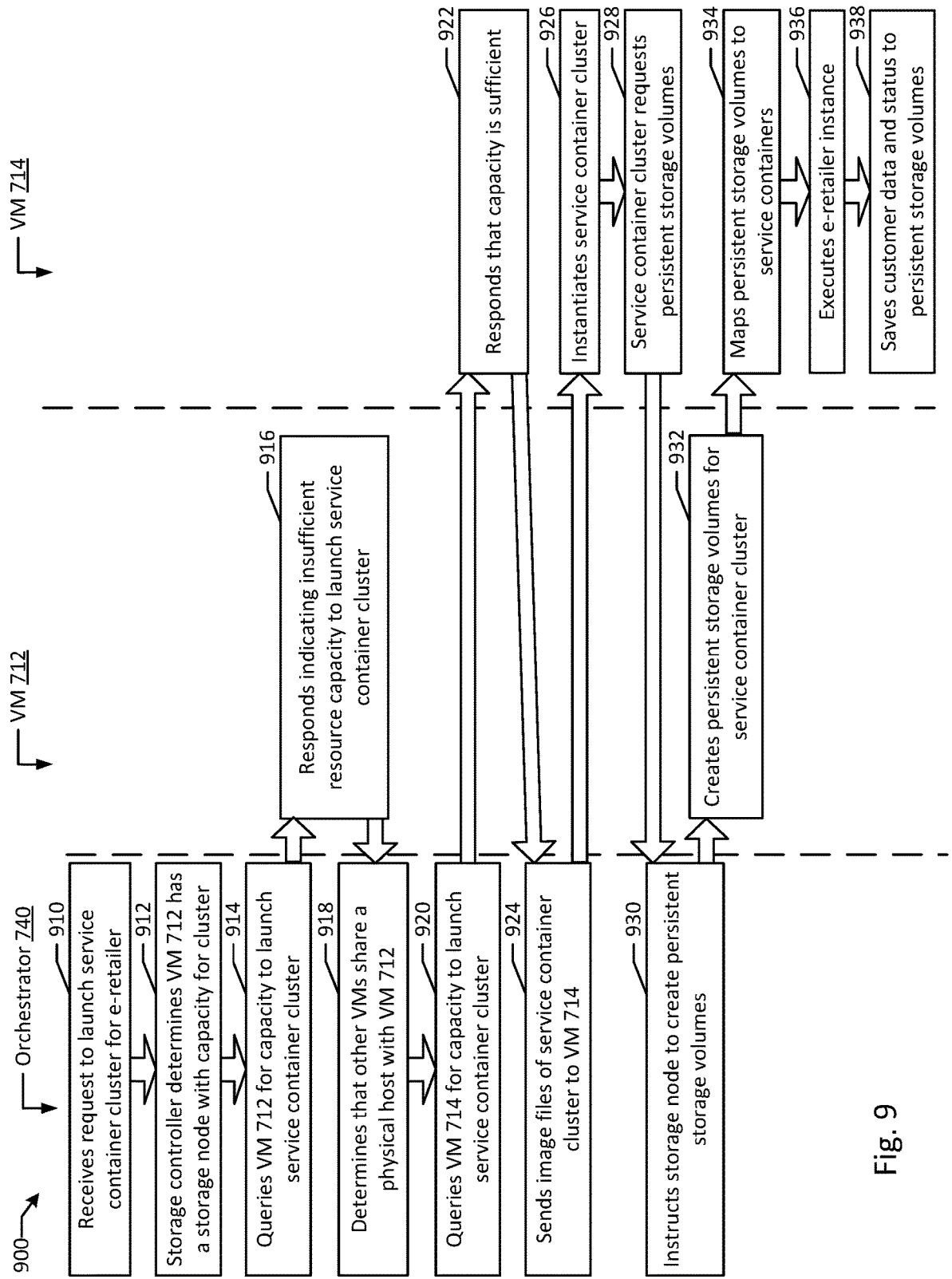
FIG. 9 is flow diagram of an example of orchestrated deployment of a service with containerized high-performance network storage according to an example of the present disclosure.

FIG. 9 is flow diagram of an example of orchestrated deployment of a service with containerized high-performance network storage according to an example of the present disclosure. Although the examples below are described with reference to the flowchart illustrated in FIG. 9, it will be appreciated that many other methods of performing the acts associated with FIG. 9 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 900, orchestrator 740, VM 712, and VM 714 combine to provision a service executing on a cluster of service containers connected to persistent storage volumes on a local storage node.

In example system 900, orchestrator 740 receives a request to launch service cluster 760 for an additional instance of a e-retailer's web platform (block 910). In the example, storage controller 742 determines that VM 712 has a storage node (e.g., storage node 752) with capacity to satisfy the storage needs of service cluster 760 (block 912). In an example, metadata associated with one or more image files associated with service containers 761-763 of service cluster 760 may inform storage controller 742 of the storage requirements of service containers 761-763. In an example, orchestrator 740 queries VM 712 to determine whether VM 712 has enough compute resource capacity to launch service cluster 760 (block 914). In an example, VM 712 responds indicating that there is insufficient resource capacity to launch service cluster 760 on VM 712 (block 916). For example, VM 712 may have insufficient storage capacity in guest memory 795 after the provisioning of storage node 752 to store the image files of service cluster 760. In an example, orchestrator 740 may then attempt to locate the next closest host for service cluster 760 in terms of physical and/or network proximity to storage node 752. In an example, orchestrator 740 determines that other VMs share a physical host with VM 712 (block 918). In an example, orchestrator 740 queries VM 714 to determine whether VM 714 has capacity to launch service cluster 760 (block 920).

In an example, VM 714 responds that VM 714 has sufficient compute capacity to host service cluster 760 (block 922). In an example, orchestrator 740 then sends image files associated with service containers 761-763 of service cluster 760 to VM 714 (block 924). In another example, orchestrator 740 may instruct VM 714 to retrieve the image files from an image file repository over network 705. In an example, VM 714 instantiates service cluster 760 (block 926). Service cluster 760 on VM 714 then requests persistent storage volumes, for example, each of service containers 761-763 requests storage controller 742 for a respective persistent storage volume (e.g., persistent storages 755-757) (block 928). In an example, orchestrator 740 instructs storage node 752 to create the persistant storages 755-757 (block 930). In the example, storage node 752 on VM 712 creates persistent storages 755-757 for service containers 761-763 upon request by storage controller 742 (block 932). In the example, service containers 761-763 on VM 714 further map their respective persistent storages 755-757 (block 934). After mapping their respective persistent storages 755-757, service containers 761-763 of service cluster 760 may begin execution as a unified instance of the e-retailer's web platform, including product search, shopping cart, and payment services (block 936). In an example, service container 761 saves customer searches to recommend products to persistent storage 755, service container 762 saves customer shopping carts for future visits to persistent storage 756, and service container 763 saves purchase history and order fulfillment status to persistent storage 757 (block 938).

Figure 10:
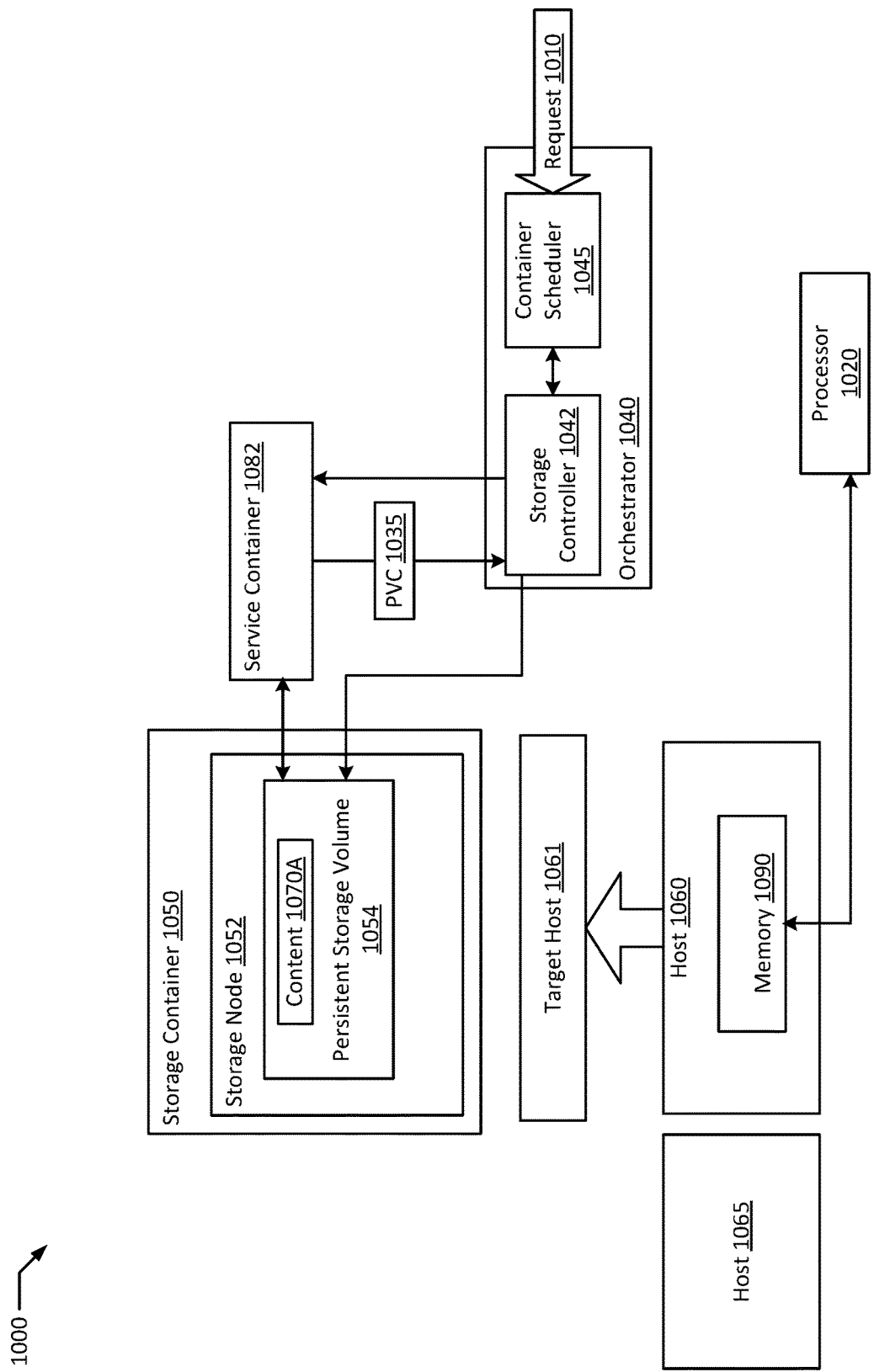
FIG. 10 is a block diagram of an example orchestrated containerized high-performance network storage according to an example of the present disclosure.

FIG. 10 is a block diagram of an example orchestrated containerized high-performance network storage according to an example of the present disclosure. Example system 1000 includes memory 1090 on host 1060 as well as host 1065. Orchestrator 1040 including storage controller 1042 and container scheduler 1045 executes on processor 1020 to receive, by container scheduler 1045, a request 1010 to instantiate service container 1062. Container scheduler 1045 queries storage controller 1042 requesting target host on which to instantiate service container 1082. Container scheduler 1045 receives from the storage controller 1042, target host 1061 selected from hosts 1060 and 1065 as the target host. Container scheduler 1045 instantiates service container 1082 on target host 1060. Instantiate, by container scheduler 1045, a storage container 1050 on host 1060, where storage controller 1042 requests instantiation of storage container 1050. Storage controller 1042 configures storage container 1050 as storage node 1052 of a distributed file system ("DFS") 1030, where storage node 1052 is associated with storage node 1057 of the distributed file system 130 and storage node 1057 is located on memory 1095. Storage controller 1040 receives persistent volume claim ("PVC") 1035 associated with service container 1082. Storage controller 1040 creates persistent storage volume 1054 in storage node 1052 based on persistent volume claim 1035. The persistent storage volume 1054 is mapped to service container 1082, where content 1070A of persistent storage volume 1054 is replicated to storage node 1057 (e.g., as content 1070B).

Through the deployment of containerized, high-performance network storage, a hyperconverged storage solution may be deployed with the performance advantages of local storage as well as the data loss protection of traditional network storage. Rather than relying on custom hardware to provide converged storage for containerized applications, by containerizing the storage system itself into a unit deployable as part of the application, containerized high-performance network storage enables rapid deployment and scalability in applications deployed on commoditized standard hardware. In addition, deployment may be simplified with storage being packaged along with applications into self-contained and self-sufficient container clusters managed through a container orchestrator. By including a storage container in a cluster of service containers performing a given task, all of the persistent storage requirements for the cluster of service containers may be fulfilled through the co-packaged storage container. Each of the service containers may be provisioned with a separate persistent storage volume out of the same storage node on the attached storage container, and therefore the whole cluster may be easily migrated and/or updated as a whole. Compatibility issues between different multi-tenant cloud providers may also be reduced since, with a virtualized storage system, deploying on clouds with different underlying hardware may typically make no difference to the application, and customizations to interface with different network storage systems may be avoided as well.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system of provisioning network storage, the system comprise: a memory and a second memory across a network from the first memory; a storage controller; a container scheduler; a plurality of hosts including a first host associated with the first memory and a second host associated with the second memory; one or more processors communicatively coupled with the first memory executing to: instantiate, by the container scheduler, a first storage container on the first host and a second storage container on the second host; configure, by the storage controller, the first storage container as a first storage node of a distributed file system and the second storage container as a second storage node of the distributed file system; instantiate, by the container scheduler, a first service container on the first host; receive, by the storage controller, a first persistent volume claim associated with the first service container; create, by the storage controller, a first persistent storage volume in the first storage node based on the first persistent volume claim; and map the first persistent storage volume to the first service container, wherein a first content of the first persistent storage volume is replicated to the second storage node.

In accordance with a 2nd exemplary aspect of the present disclosure, which may be used in combination with any one or more of the preceding aspects (e.g., the 1st aspect), wherein the container scheduler determines whether the first storage node meets a performance threshold of a second service container based on at least one of (i) a network latency between the first storage node and the second service container, and (ii) a physical location of the first storage node and a physical location of the second service container. In accordance with a 3rd exemplary aspect of the present disclosure, which may be used in combination with any one or more of the preceding aspects (e.g., the 2nd aspect), wherein the physical location of the first storage node is determined based on at least one of a data center identifier, a zone identifier, a rack identifier, and a node identifier of the first storage node.

In accordance with a 4th exemplary aspect of the present disclosure, which may be used in combination with any one or more of the preceding aspects (e.g., the 1st aspect), wherein a second service container is instantiated on a third host and issues a second persistent volume claim. In accordance with a 5th exemplary aspect of the present disclosure, which may be used in combination with any one or more of the preceding aspects (e.g., the 4th aspect), wherein a second persistent storage volume is created in the second storage node and the second persistent storage volume is mapped to the second service container. In accordance with a 6th exemplary aspect of the present disclosure, which may be used in combination with any one or more of the preceding aspects (e.g., the 4th aspect), wherein the first storage node and the second storage node fail to meet a performance threshold of the second persistent volume claim, and a third storage container is instantiated and configured as a third storage node of the distributed file system. In accordance with a 7th exemplary aspect of the present disclosure, which may be used in combination with any one or more of the preceding aspects (e.g., the 6th aspect), wherein the third storage container is instantiated with at least one of a shared node, a shared rack, and a shared zone with the second service container, a second persistent storage volume is created in the third storage node, and the second persistent storage volume is mounted to the second service container.

In accordance with a 8th exemplary aspect of the present disclosure, which may be used in combination with any one or more of the preceding aspects (e.g., the 1st aspect), wherein the first content of the first persistent storage volume is further replicated to a third storage node of the distributed file system. In accordance with a 9th exemplary aspect of the present disclosure, which may be used in combination with any one or more of the preceding aspects (e.g., the 1st aspect), wherein a second content of the first persistent storage volume is replicated to a third storage node of the distributed file system. In accordance with a 10th exemplary aspect of the present disclosure, which may be used in combination with any one or more of the preceding aspects (e.g., the 1st aspect), wherein the first service container communicates with the first persistent storage volume through a service port on the first storage container. In accordance with a 11th exemplary aspect of the present disclosure, which may be used in combination with any one or more of the preceding aspects (e.g., the 1st aspect), wherein the first content of the first persistent storage volume is encrypted, in accordance with a 12th exemplary aspect of the present disclosure, which may be used in combination with any one or more of the preceding aspects (e.g., the 1st aspect), wherein the first persistent storage volume is mapped to a second service container instantiated to replace the first service container. In accordance with a 13th exemplary aspect of the present disclosure, which may be used in combination with any one or more of the preceding aspects (e.g., the 1st aspect), wherein a third storage container is instantiated on the first host as an updated version of the first storage container, and the first persistent storage volume is migrated to the third storage container from the first storage container.

Aspects of the subject matter described herein may be useful alone or in combination with one or more other aspects described herein. In a 14th exemplary aspect of the present disclosure, a method of provisioning network storage, the method comprises: instantiating a first storage container on a first host and a second storage container on a second host; configuring the first storage container as a first storage node of a distributed file system and the second storage container as a second storage node of the distributed file system; instantiating a first service container on the first host; receiving a first persistent volume claim associated with the first service container; creating a first persistent storage volume in the first storage node based on the first persistent volume claim; and mapping the first persistent storage volume to the first service container, wherein a first content of the first persistent storage volume is replicated to the second storage node.

In accordance with a 15th exemplary aspect of the present disclosure, which may be used in combination with any one or more of the preceding aspects (e.g., the 14th aspect), wherein a container scheduler determines whether the first storage node meets a performance threshold of a second service container based on at least one of (i) a network latency between the first storage node and the second service container, and (ii) a physical location of the first storage node and a physical location of the second service container. In accordance with a 16th exemplary aspect of the present disclosure, which may be used in combination with any one or more of the preceding aspects (e.g., the 14th aspect), wherein a second service container is instantiated on a third host and issues a second persistent volume claim, and a second persistent storage volume is created in one of the second storage node and a third storage node instantiated with at least one of a shared node, a shared rack, and a shared zone with the second service container. In accordance with a 17th exemplary aspect of the present disclosure, which may be used in combination with any one or more of the preceding aspects (e.g., the 14th aspect), wherein the first content of the first persistent storage volume is further replicated to a third storage node of the distributed file system. In accordance with a 18th exemplary aspect of the present disclosure, which may be used in combination with any one or more of the preceding aspects (e.g., the 14th aspect), wherein a second content of the first persistent storage volume is replicated to a third storage node of the distributed file system. In accordance with a 19th exemplary aspect of the present disclosure, which may be used in combination with any one or more of the preceding aspects (e.g., the 14th aspect), wherein the first persistent storage volume is mapped to a second service container instantiated to replace the first service container.

Aspects of the subject matter described herein may be useful alone or in combination with one or more other aspects described herein. In a 20th exemplary aspect of the present disclosure, a computer-readable non-transitory storage medium storing executable instructions of provisioning network storage, which when executed by a computer system, cause the computer system to: instantiate a first storage container on a first host and a second storage container on a second host; configure the first storage container as a first storage node of a distributed file system and the second storage container as a second storage node of the distributed file system; instantiate a first service container on the first host; receive a first persistent volume claim associated with the first service container; create a first persistent storage volume in the first storage node based on the first persistent volume claim; and map the first persistent storage volume to the first service container, wherein a first content of the first persistent storage volume is replicated to the second storage node.

Aspects of the subject matter described herein may be useful alone or in combination with one or more other aspects described herein. In a 21st exemplary aspect of the present disclosure, a system comprises: a means for instantiating a first storage container on a first host and a second storage container on a second host; a means for configuring the first storage container as a first storage node of a distributed file system and the second storage container as a second storage node of the distributed file system; a means for instantiating a first service container on the first host; a means for receiving a first persistent volume claim associated with the first service container; a means for creating a first persistent storage volume in the first storage node based on the first persistent volume claim; and a means for mapping the first persistent storage volume to the first service container, wherein a first content of the first persistent storage volume is replicated to the second storage node.

Aspects of the subject matter described herein may be useful alone or in combination with one or more other aspects described herein. In a 22nd exemplary aspect of the present disclosure, a system comprises: a first memory; a plurality of hosts including a first host associated with the first memory; one or more processors; and an orchestrator including a storage controller and a container scheduler executing on the one or more processors to: receive, by the container scheduler, a request to instantiate a first service container; query, by the container scheduler, the storage controller requesting a target host of the plurality of hosts on which to instantiate the first service container; receive, by the container scheduler from the storage controller, the first host as the target host; instantiate, by the container scheduler, the first service container on the first host; instantiate, by the container scheduler, a first storage container on the first host, wherein the storage controller requests instantiation of the first storage container; configure, by the storage controller, the first storage container as a first storage node; receive, by the storage controller, a first persistent volume claim associated with the first service container; create, by the storage controller, a first persistent storage volume in the first storage node based on the first persistent volume claim; and map the first persistent storage volume to the first service container.

In accordance with a 23rd exemplary aspect of the present disclosure, which may be used in combination with any one or more of the preceding aspects (e.g., the 22nd aspect), wherein the orchestrator instantiates a second service container on a third host based on determining whether the first storage node meets a performance threshold of the second service container and the second service container issues a second persistent volume claim. In accordance with a 24th exemplary aspect of the present disclosure, which may be used in combination with any one or more of the preceding aspects (e.g., the 23rd aspect), wherein the performance threshold is determined based on at least one of (i) a network latency between the first storage node and a second service container, and (ii) a physical location of the first storage node and a physical location of the second service container. In accordance with a 25th exemplary aspect of the present disclosure, which may be used in combination with any one or more of the preceding aspects (e.g., the 23rd aspect), wherein a second memory across a network from the first memory is associated with a second host, and the orchestrator further executes to: instantiate a second storage container on the second memory; configure the second storage container as a second storage node; add the first storage node and the second storage node to a distributed file system; create a second persistent storage volume in the second storage node mapped to a second service container; and replicate a contents of the second persistent storage volume to the first storage node. In accordance with a 26th exemplary aspect of the present disclosure, which may be used in combination with any one or more of the preceding aspects (e.g., the 25th aspect), wherein a third storage container is instantiated and configured as a third storage node of the distributed file system, and a third persistent storage volume is created in the third storage node and then mapped to a third service container. In accordance with a 27th exemplary aspect of the present disclosure, which may be used in combination with any one or more of the preceding aspects (e.g., the 26th aspect), wherein the third storage container is instantiated with at least one of a shared node, a shared rack, and a shared zone with the third service container.

In accordance with a 28th exemplary aspect of the present disclosure, which may be used in combination with any one or more of the preceding aspects (e.g., the 22nd aspect), wherein the first persistent storage volume is mapped to a second service container instantiated to replace the first service container. In accordance with a 29th exemplary aspect of the present disclosure, which may be used in combination with any one or more of the preceding aspects (e.g., the 22nd aspect), wherein a third storage container is instantiated on the first host as an updated version of the first storage container, and the first persistent storage volume is migrated to the third storage container from the first storage container. In accordance with a 30th exemplary aspect of the present disclosure, which may be used in combination with any one or more of the preceding aspects (e.g., the 22nd aspect), wherein the orchestrator is configured to deploy a container cluster including the first storage container and the first service container on a single host. In accordance with a 31st exemplary aspect of the present disclosure, which may be used in combination with any one or more of the preceding aspects (e.g., the 22nd aspect), wherein a first cluster of service containers including the first service container are instantiated and each service container of the first cluster of service containers maps a respective persistent storage volume on the first storage node.

Aspects of the subject matter described herein may be useful alone or in combination with one or more other aspects described herein. In a 32nd exemplary aspect of the present disclosure, a method comprises: receiving a request to instantiate a first service container; querying a storage controller requesting a target host of a plurality of hosts on which to instantiate the first service container; receiving a first host as the target host; instantiating the first service container on the first host; instantiating a first storage container on the first host, wherein the storage controller requests instantiation of the first storage container; configuring the first storage container as a first storage node; receiving a first persistent volume claim associated with the first service container; creating a first persistent storage volume in the first storage node based on the first persistent volume claim; and mapping the first persistent storage volume to the first service container.

In accordance with a 33rd exemplary aspect of the present disclosure, which may be used in combination with any one or more of the preceding aspects (e.g., the 32nd aspect), wherein a second service container is instantiated on a third host based on determining whether the first storage node meets a performance threshold of the second service container and the second service container issues a second persistent volume claim. In accordance with a 34th exemplary aspect of the present disclosure, which may be used in combination with any one or more of the preceding aspects (e.g., the 33rd aspect), wherein a second storage node across a network from the first storage node is configured on a second storage container, the first storage node and the second storage node are added to a distributed file system, a second persistent storage volume is created in the second storage node mapped to a second service container, and a contents of the second persistent storage volume is replicated to the first storage node. In accordance with a 35th exemplary aspect of the present disclosure, which may be used in combination with any one or more of the preceding aspects (e.g., the 34th aspect), wherein a third storage container is instantiated and configured as a third storage node of the distributed file system, and a third persistent storage volume is created in the third storage node and then mapped to a third service container.

In accordance with a 36th exemplary aspect of the present disclosure, which may be used in combination with any one or more of the preceding aspects (e.g., the 32nd aspect), wherein the first persistent storage volume is mapped to a second service container instantiated to replace the first service container. In accordance with a 37th exemplary aspect of the present disclosure, which may be used in combination with any one or more of the preceding aspects (e.g., the 32nd aspect), wherein a third storage container is instantiated on the first host as an updated version of the first storage container, and the first persistent storage volume is migrated to the third storage container from the first storage container. In accordance with a 38th exemplary aspect of the present disclosure, which may be used in combination with any one or more of the preceding aspects (e.g., the 32nd aspect), wherein the first storage container and the first service container are parts of a container cluster deployed together on a same host.

Aspects of the subject matter described herein may be useful alone or in combination with one or more other aspects described herein. In a 39th exemplary aspect of the present disclosure, a computer-readable non-transitory storage medium storing executable instructions, which when executed by a computer system, cause the computer system to: receive a request to instantiate a first service container; query a storage controller requesting a target host of a plurality of hosts on which to instantiate the first service container; receive a first host as the target host; instantiate the first service container on the first host; instantiate a first storage container on the first host, wherein the storage controller requests instantiation of the first storage container; configure the first storage container as a first storage node; receive a first persistent volume claim associated with the first service container; create a first persistent storage volume in the first storage node based on the first persistent volume claim; and map the first persistent storage volume to the first service container.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a first memory and a second memory across a network from the first memory;
a storage controller;
a container scheduler;
a plurality of hosts including a first host associated with the first memory and a second host associated with the second memory; and
one or more processors communicatively coupled with the first memory executing to:
instantiate, by the container scheduler, a first storage container on the first host and a second storage container on the second host;
configure, by the storage controller, the first storage container as a first storage node of a distributed file system and the second storage container as a second storage node of the distributed file system;
instantiate, by the container scheduler, a first service container on the first host;

receive, by the storage controller, a first persistent volume claim associated with the first service container;

create, by the storage controller, a first persistent storage volume in the first storage node based on the first persistent volume claim; and map the first persistent storage volume to the first service container, wherein a first content of the first persistent storage volume is replicated to the second storage node.

2. The system of claim 1, wherein the container scheduler determines whether the first storage node meets a performance threshold of a second service container based on at least one of (i) a network latency between the first storage node and the second service container, and (ii) a first physical location of the first storage node and a second physical location of the second service container.

3. The system of claim 2, wherein the physical location of the first storage node is determined based on at least one of a data center identifier, a zone identifier, a rack identifier, and a node identifier of the first storage node.

4. The system of claim 1, wherein a second service container is instantiated on a third host and issues a second persistent volume claim.

5. The system of claim 4, wherein a second persistent storage volume is created in the second storage node and the second persistent storage volume is mapped to the second service container.

6. The system of claim 4, wherein the first storage node and the second storage node fail to meet a performance threshold of the second persistent volume claim, and a third storage container is instantiated and configured as a third storage node of the distributed file system.

7. The system of claim 6, wherein the third storage container is instantiated with at least one of a shared node, a shared rack, and a shared zone with the second service container, a second persistent storage volume is created in the third storage node, and the second persistent storage volume is mounted to the second service container.

8. The system of claim 1, wherein the first content of the first persistent storage volume is further replicated to a third storage node of the distributed file system.

9. The system of claim 1, wherein a second content of the first persistent storage volume is replicated to a third storage node of the distributed file system.

10. The system of claim 1, wherein the first service container communicates with the first persistent storage volume through a service port on the first storage container.

11. The system of claim 1, wherein the first content of the first persistent storage volume is encrypted.

12. The system of claim 1, wherein the first persistent storage volume is mapped to a second service container instantiated to replace the first service container.

13. The system of claim 1, wherein a third storage container is instantiated on the first host as an updated version of the first storage container, and the first persistent storage volume is migrated to the third storage container from the first storage container.

14. A method comprising:
instantiating, by a container scheduler executing on one or more processors, a first storage container on a first host and a second storage container on a second host;
configuring, by a storage controller executing on the one or more processors, the first storage container as a first storage node of a distributed file system and the second storage container as a second storage node of the distributed file system;
instantiating, by the container scheduler, a first service container on the first host;

receiving, by the storage controller, a first persistent volume claim associated with the first service container;
creating, by the storage controller, a first persistent storage volume in the first storage node based on the first persistent volume claim; and
mapping the first persistent storage volume to the first service container, wherein a first content of the first persistent storage volume is replicated to the second storage node.

15. A system comprising:
a first memory;
a plurality of hosts including a first host associated with the first memory;
one or more processors; and
an orchestrator including a storage controller and a container scheduler executing on the one or more processors to:
receive, by the container scheduler, a request to instantiate a first service container;
query, by the container scheduler, the storage controller requesting a target host of the plurality of hosts on which to instantiate the first service container;
receive, by the container scheduler from the storage controller, the first host as the target host;
instantiate, by the container scheduler, the first service container on the first host;
instantiate, by the container scheduler, a first storage container on the first host, wherein the storage controller requests instantiation of the first storage container;
configure, by the storage controller, the first storage container as a first storage node;
receive, by the storage controller, a first persistent volume claim associated with the first service container;
create, by the storage controller, a first persistent storage volume in the first storage node based on the first persistent volume claim; and
map the first persistent storage volume to the first service container.

16. The system of claim 15, wherein the orchestrator instantiates a second service container on a third host based on determining whether the first storage node meets a performance threshold of the second service container, and the second service container issues a second persistent volume claim.

17. The system of claim 16, wherein the performance threshold is determined based on at least one of (i) a network latency between the first storage node and the second service container, and (ii) a first physical location of the first storage node and a second physical location of the second service container.

18. The system of claim 16, wherein a second memory across a network from the first memory is associated with a second host, and the orchestrator further executes to:
instantiate a second storage container on the second memory;
configure the second storage container as a second storage node;
add the first storage node and the second storage node to a distributed file system;
create a second persistent storage volume in the second storage node mapped to the second service container; and
replicate a contents of the second persistent storage volume to the first storage node.

19. The system of claim 15, wherein the orchestrator is configured to deploy a container cluster including the first storage container and the first service container on a single host.

20. The system of claim 15, wherein a first cluster of service containers including the first service container are instantiated and each service container of the first cluster of service containers maps a respective persistent storage volume on the first storage node.

* * * * *